United States Patent [19]
Dwivedi et al.

[11] Patent Number: 5,529,109
[45] Date of Patent: * Jun. 25, 1996

[54] FLOTATION PROCESS FOR THE FORMATION OF METAL MATRIX COMPOSITE BODIES

[75] Inventors: Ratnesh K. Dwivedi, Wilmington; John T. Burke; Gerhard H. Schiroky, both of Hockessin, all of Del.; Michael K. Aghajanian, Bel Air, Md.; Steven D. Keck, Hockessin, Del.

[73] Assignee: Lanxide Technology Company, LP, Newark, Del.

[ * ] Notice: The portion of the term of this patent subsequent to Mar. 19, 2008, has been disclaimed.

[21] Appl. No.: 394,915

[22] Filed: Feb. 27, 1995

Related U.S. Application Data

[63] Continuation of Ser. No. 104,253, Aug. 9, 1993, abandoned, which is a continuation of Ser. No. 833,583, Feb. 10, 1992, abandoned, which is a continuation of Ser. No. 520,916, May 9, 1990, abandoned, which is a continuation-in-part of Ser. No. 269,373, Nov. 10, 1988, Pat. No. 5,000,246.

[51] Int. Cl.⁶ .................................................. B22D 19/14
[52] U.S. Cl. .................................................. 164/97; 164/98
[58] Field of Search .................................. 164/91, 97, 98, 164/100–105, 112

[56] References Cited

U.S. PATENT DOCUMENTS

| | | | |
|---|---|---|---|
| 2,291,026 | 7/1942 | Chace | 164/70.1 |
| 3,599,601 | 8/1971 | Ishikawa | 164/61 |
| 3,604,494 | 9/1971 | Trager | 164/91 |
| 3,695,337 | 10/1972 | Grand | 164/100 |
| 3,907,514 | 9/1975 | Demendi | 428/614 |
| 4,235,277 | 11/1980 | Aizawa | 164/119 |
| 4,683,936 | 8/1987 | Cybulsky | 164/97 |
| 4,935,055 | 6/1990 | Aghajanian | 164/66.1 |
| 5,000,246 | 3/1991 | Dwivedi | 164/97 |
| 5,000,249 | 3/1991 | Burke | 164/97 |
| 5,004,036 | 4/1991 | Becker | 164/97 |
| 5,005,631 | 4/1991 | Dwivedi | 164/97 |
| 5,120,580 | 6/1992 | Lesher et al. | 427/383.5 |

FOREIGN PATENT DOCUMENTS

| | | | |
|---|---|---|---|
| 62-161463 | 7/1987 | Japan | 164/97 |
| 1731419 | 5/1992 | U.S.S.R. | 164/97 |
| 2133330 | 7/1984 | United Kingdom | 164/98 |

*Primary Examiner*—Kuang Y. Lin
*Attorney, Agent, or Firm*—Jeffrey R. Ramberg

[57] ABSTRACT

The present invention relates to a novel method for forming metal matrix composite bodies. Particularly, a permeable mass of filler material is formed into a preform. The preform material can then be placed onto the surface of or into a matrix metal alloy, whereupon the matrix metal alloy spontaneously infiltrates the preform. After substantial complete infiltration of the preform, the preform begins to at least partially sink into the matrix metal alloy supply. The depth to which the preform may sink into the molten matrix metal alloy is controlled by utilizing a support means. The support means prevents the preform being infiltrated from submerging completely beneath the surface of the matrix metal alloy supply. The matrix metal which has infiltrated the preform is then allowed to cool, thus forming a metal matrix composite body.

20 Claims, 5 Drawing Sheets

FLOTATION PROCESS FOR THE FORMATION OF METAL MATRIX COMPOSITE BODIES

CROSS-REFERENCE TO RELATED APPLICATIONS

This is a continuation of application(s) Ser. No. 08/104,253 filed on Aug. 9, 1993, now abandoned, which is a continuation of U.S. Ser. No. 07/833,583, filed on Feb. 10, 1992, and now abandoned, which is a continuation of U.S. Ser. No. 07/520,916, filed on May 9, 1990, and now abandoned, which is a continuation-in-part of U.S. Ser. No. 07/269,373, filed on Nov. 10, 1988, and which issued on Mar. 19, 1991, as U.S. Pat. No. 5,000,246.

FIELD OF THE INVENTION

The present invention relates to a novel method for forming metal matrix composite bodies. Particularly, a permeable mass of filler material is formed into a preform. The preform material then can be placed onto the surface of or into a pool of molten matrix metal in the presence of an infiltration enhancer, and/or an infiltration enhancer precursor and/or an infiltrating atmosphere, at least at some point during the process, whereupon molten matrix metal spontaneously infiltrates the preform. During infiltration of the matrix metal into the preform, the preform may at least partially sink into the pool of matrix metal, thus indicating that infiltration has occurred. The amount that the preform is permitted to sink may be controlled by the use of a support means.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the matrix metal. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50 percent by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25:1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 0094353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968 to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which is formed into a preform, with molten matrix metal (e.g., aluminum) in the presence of an infiltrating atmosphere (e.g., nitrogen) under normal atmospheric pressures so long as an infiltration enhancer is present at least at some point during the process.

DESCRIPTION OF COMMONLY OWNED U.S. PATENT AND PATENT APPLICATIONS

The subject matter of this application is related to that of a co-owned Patent and several other copending and co-owned patent applications. Particularly, the patent and other copending patent applications describe novel methods for making metal matrix composite materials (hereinafter sometimes referred to as "Commonly Owned Metal Matrix Patent and Patent Applications").

A novel method of making a metal matrix composite material is disclosed in Commonly Owned U.S. Pat. No. 4,828,008, which issued May 9, 1989, from U.S. patent application Ser. No. 049,171, filed May 13, 1987, in the names of White et al., and entitled "Metal Matrix Composites" and which published in the EPO on Nov. 17, 1988, as Publication No. 0291441. According to the method of this White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. patent application Ser. No. 141,642, filed Jan. 7, 1988, in the names of Michael K. Aghajanian et al., and entitled "Method of Making Metal Matrix Composite with the use of a Barrier", now U.S. Pat. No. 4,935,055, which issued on Jun. 19, 1990, and which published in the EPO on Jul. 12, 1989, as Publication No. 0323945. According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and copending U.S. patent application Ser. No. 07/994,064, filed on Dec. 18, 1992, which is a continuation of U.S. patent application Ser. No. 07/759,745, filed on Sep. 12, 1991, now abandoned, which was a continuation of U.S. patent application Ser. No. 07/517,541, filed on Apr. 24, 1990, now abandoned, which was a continuation of U.S. patent application Ser. No. 168,284, filed Mar. 15, 1988, now abandoned, in the names of Michael K. Aghajanian and Marc S. Newkirk and entitled "Metal Matrix Composites and Techniques for Making the Same", and which published in the EPO on Sep. 20, 1989, as Publication No. 0333629. In accordance with the methods disclosed in this U.S. patent application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/863,894, filed on Apr. 6, 1992, as a continuation of U.S. patent application Ser. No. 07/521,043, filed on May 9, 1990, now abandoned, which was a continuation-in-part of U.S. patent application Ser. No. 07/484, 753, filed on Feb. 23, 1990, now abandoned, which was a continuation-in-part of U.S. patent application Ser. No. 07/432,661, filed on Nov. 7, 1989, now abandoned, which was a continuation-in-part of U.S. patent application Ser. No. 07/416,327, filed Oct. 6, 1989, now abandoned which was a continuation-in-part application of U.S. patent application Ser. No. 07/349,590, filed May 9, 1989, now abandoned, which in turn was a continuation-in-part application of U.S. patent application Ser. No. 07/269,311, filed Nov. 10, 1988, now abandoned, all of which were filed in the names of Michael K. Aghajanian et al. and all of which are entitled "A Method of Forming Metal Matrix Composite Bodies By A Spontaneous Infiltration Process, and Products Produced Therefrom". According to these Aghajanian et al. applications, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/ infiltration enhancer precursor/infiltrating atmosphere systems which exhibit spontaneous infiltration. Specifically, Aghajanian et al. disclose that spontaneous infiltration behavior has been observed in the aluminum/magnesium/ nitrogen system; the aluminum/strontium/nitrogen system; the aluminum/zinc/oxygen system; and the aluminum/calcium/nitrogen system. However, it is clear from the disclosure set forth in the Aghajanian et al. applications that the spontaneous infiltration behavior should occur in other matrix metal/infiltration enhancer precursor/infiltrating atmosphere systems.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite body is produced by infiltrating a permeable mass of filler material which has been formed into a preform. Specifically, a matrix metal is made molten and is held within an appropriate nonreactive vessel for housing matrix metal (e.g., a suitable refractory container) forming a pool of molten matrix metal. In a first preferred embodiment, the preform is placed onto a surface of the pool of matrix metal in the presence of an infiltrating atmosphere. In addition, a precursor to an infiltration enhancer and/or an infiltration enhancer and/or an infiltrating atmosphere are also in communication with the preform, at least at some point during the process, which permits molten matrix metal to spontaneously infiltrate the preform when the preform is placed into the molten matrix metal. The preform may float on a surface of the molten matrix metal or somewhere within the molten matrix metal due to its natural buoyancy relative to the molten matrix metal. Moreover, the preform may be removably attached to a support means (e.g., floating means) which assists the preform to float and/or prevents the preform from sinking completely below the surface of the molten metal. In an alternative embodiment, the preform may be contacted with matrix metal prior to the matrix metal becoming molten, for example, the preform could be embedded in particles or chunks of solid matrix metal, and thereafter the matrix metal may become molten.

During spontaneous infiltration of the preform, the preform, whether or not attached to a support means, may begin to at least partially sink into the pool of molten matrix metal, thereby indicating that infiltration has occurred. Further, it is possible that a preform may have negative buoyancy in the molten matrix metal prior to spontaneous infiltration, which buoyancy may change afterward. Accordingly, the preform may rise, fall or maintain its position within the pool of molten matrix metal, thereby indicating that infiltration has occurred.

Still further, once infiltration has occurred substantially completely, in some cases the preform is observed to sink, at least partially, into the source of matrix metal alloy. In a preferred embodiment wherein the preform initially floats at least partially on a surface of molten matrix alloy, the preform substantially completely sinks to a point which is approximately at or below the surface of the matrix metal alloy, thereby indicating that infiltration has been substantially completed.

In another preferred embodiment, the extent to which a preform may sink within the molten matrix alloy is controlled. Specifically, a support means (e.g., pins, rods, protuberances, etc.) may be located, for example, on the bottom of the nonreactive vessel which houses the matrix metal in order to prevent the preform from sinking completely into the molten matrix metal. For example, a plurality of pins constructed of a suitable refractory material extend upwardly from the bottom of the nonreactive vessel and contact at least a bottom portion of the preform substantially continuously during the process or for only a portion of the process. For example, the support means may contact the preform substantially continuously throughout the infiltration process so as to cause at least a portion of the preform to protrude above the surface of the matrix metal throughout the infiltration process. In another alternative, the support means may contact the preform for only a portion of the infiltration process. Specifically, as the preform is infiltrated, the preform, typically, submerges into the molten matrix metal. The support means can be positioned so that as the preform begins to sink, the preform attaches onto the support means. Thus, the support means can control the degree to which the preform sinks into the molten matrix metal. For example, if the support means comprises a plurality of pins, the height of the pins determines the depth to which the preform may sink.

Alternatively, the support means may comprise one or more sacrificial legs or protrusions which extend from at least one surface of the preform. The sacrificial protrusions, typically, extend from a bottom portion of the preform. The sacrificial protrusions serve to prevent the preform from submerging into the matrix metal beyond a desired extent. For example, the length of the sacrificial protrusions can be selected so that when the protrusions contact the bottom of the nonreactive vessel, at least a portion of the preform extends above a surface of the matrix metal. After the spontaneous infiltration is complete, the protrusions may be removed from the formed metal matrix composite by any conventional technique including, for example, sawing, grinding, etc.

Still further, the use of a barrier material on one or more surfaces of the preform may enhance the surface finish of the formed metal matrix composite body. The barrier material can be placed on any number of surfaces of the preform so long as at least a portion of the preform is free to communicate with the matrix metal. A suitable barrier material which can be placed onto the surface of the preform comprises a graphite material which is capable of being painted, sprayed, etc., onto the desired surfaces of the preform.

It is noted that this application discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor/infiltrating atmosphere system of aluminum/magnesium/nitrogen exhibits spontaneous infiltration. However, other matrix metal/infiltration enhancer precursor/infiltrating atmosphere systems may also behave in a manner similar to the system aluminum/magnesium/nitrogen. For example, similar spontaneous infiltration behavior has been observed in the aluminum/strontium/nitrogen system; the aluminum/zinc/oxygen system; and the aluminum/calcium/nitrogen system. Accordingly, even though the aluminum/magnesium/nitrogen system is discussed primarily herein, it should be understood that other matrix metal/infiltration enhancer precursor/infiltrating atmosphere systems may behave in a similar manner.

Moreover, rather than supplying an infiltration enhancer precursor, an infiltration enhancer may be supplied directly to at least one of the preform and/or matrix metal and/or infiltrating atmosphere. Ultimately, at least during the spontaneous infiltration, the infiltration enhancer should be located in at least a portion of the filler material or preform.

When the matrix metal comprises an aluminum alloy, the aluminum alloy is contacted with a preform comprising a filler material (e.g., alumina or silicon carbide), the filler material having admixed therewith, or at some point during the process being exposed to, magnesium. Moreover, in one preferred embodiment the aluminum alloy and/or preform and/or filler material are contained in a nitrogen atmosphere for at least a portion of the process. The preform will be spontaneously infiltrated by the matrix metal and the extent or rate of spontaneous infiltration and formation of metal matrix will vary with a given set of process conditions including, for example, the concentration of magnesium provided to the system (e.g., in the aluminum alloy and/or in the preform and/or in the infiltrating atmosphere), the size and/or composition of the particles in the preform, the concentration of nitrogen in the infiltrating atmosphere, the time permitted for infiltration, and/or the temperature at which infiltration occurs. Spontaneous infiltration typically occurs to an extent sufficient to embed substantially completely the preform.

Definitions

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite (e.g., before infiltration) and/or that material which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever virgules ("/") appear between an exemplary matrix metal, infiltration enhancer precursor and infiltrating atmosphere, the virgules are used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain molten matrix metal under the process conditions and not react with the matrix and/or the infiltrating atmosphere and/or infiltration enhancer precursor in a manner which would be significantly detrimental to the spontaneous infiltration mechanism.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Spontaneous Infiltration", as used herein, means the infiltration of matrix metal into the permeable mass of filler or preform occurs without requirement for the application of pressure or vacuum (whether externally applied or internally created).

"Support Means", as used herein, means any structural element which may be removably attached to a preform and which controls the amount that the preform may sink below the surface of the matrix metal. In some embodiments, the support means may comprise a combination of structural elements.

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein:

FIG. 12 shows how the claimed invention may be utilized to produce continually a plurality of metal matrix composite bodies. Specifically.

DETAILED DESCRIPTION OF THE INVENTION AND PREFERRED EMBODIMENTS

The present invention relates to forming a metal matrix composite body by placing a preform that floats adjacent to or on a surface of a pool of molten matrix metal or somewhere within the molten matrix metal pool and spontaneously infiltrating the preform with the molten matrix metal to a desired extent. In order to effect spontaneous infiltration of the matrix metal into the preform, an infiltration enhancer should be provided to the spontaneous system. An infiltration enhancer could be formed from an infiltration enhancer precursor which could be provided (1) in the matrix metal; and/or (2) in the preform; and/or (3) from the infiltrating atmosphere and/or (4) from an external source into the spontaneous system. Moreover, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be located in at least a portion of the filler material or preform.

Figure 1:
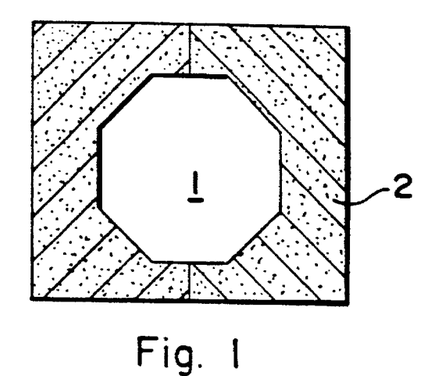
FIG. 1 shows a cross-section of a reusable mold for making a preform for use in accordance with the present invention.

In accordance with the invention, a preform may be formed by suitably molding a mass of a filler material within a mold, as shown in FIG. 1. For example, the filler may comprise a mixture of a ceramic material such as silicon carbide (or other suitable filler as discussed in detail below). The filler may be packed into a cavity (1) in a mold (2) in an amount consistent with the properties desired for the finished metal matrix composite body. The filler is then preferably converted to a preform (e.g., a rigidized body that retains shape integrity and green strength, under process conditions). The preform may contain an infiltration enhancer precursor, such as magnesium which may be converted to an infiltration enhancer during processing. Alternatively, an infiltration enhancer may be formed in the preform before immersion in the molten matrix metal. For example, magnesium as an infiltration enhancer precursor may be converted to magnesium nitride as an infiltration enhancer in the presence of nitrogen to form a preform having infiltration enhancer formed therein. As yet another alternative, the preform may contain no infiltrating enhancer or infiltrating enhancer precursor, in which case an infiltration enhancer must be supplied or formed elsewhere in the spontaneous system.

Figure 2:
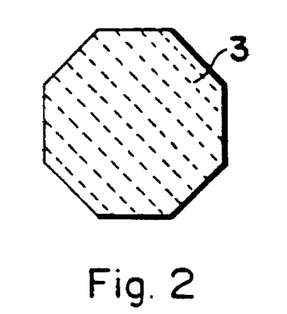
FIG. 2 shows a preform for use in accordance with the present invention.

The preform (3) may then be removed from the mold (2), as illustrated in FIG. 2, thereby allowing the reuse of the mold (2) which may be formed of any suitable material, such as plaster of Paris or silicone rubber, that provides shape fidelity for the filler. Conventional split molds, multi-piece molds, investment shell molds and the like are suitable for this purpose. Alternatively, the preform (3) may remain in a mold, made, for example, from metal foil that may be consumed during subsequent processing steps. In any event, the preform (3) should be suitably handled to prevent degradation of the infiltration enhancer by keeping the preform in an infiltrating or inert atmosphere and to prevent other physical damage before the formation of the metal matrix composite body is complete.

Figure 3:
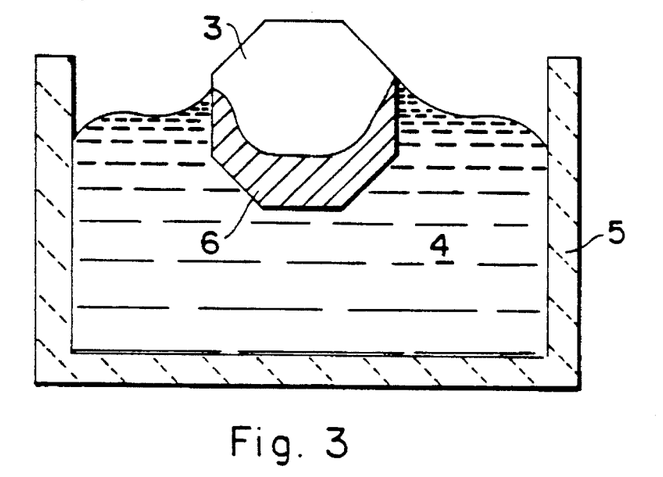
FIG. 3 shows the preform afloat in a pool of molten matrix metal in accordance with the present invention.

As shown in FIG. 3, the preform (3) may then be placed into contact with a pool (4) of molten matrix metal that is retained in a suitable refractory container (5). Spontaneous infiltration of the preform by the matrix metal into at least a portion of the preform (3) produces a metal matrix composite body (6) in that portion of the preform (3) which has been infiltrated. The preform (3) may be introduced to the pool (4) of molten matrix metal by simply placing the preform (3) on the surface of the molten metal pool (4). Alternatively, the preform (3) may be placed in a suitable crucible or other nonreactive container for housing matrix metal, surrounded by a quantity of matrix metal ingots, and heated to melt the matrix metal around the preform. Introduction of preforms to an existing pool of matrix metal can provide faster production of finished metal matrix composites because no time is needed to melt the matrix metal. Pre-heating the preforms may be desirable, however, to avoid thermal shock and resultant cracking or degradation of the preform.

Figure 9:
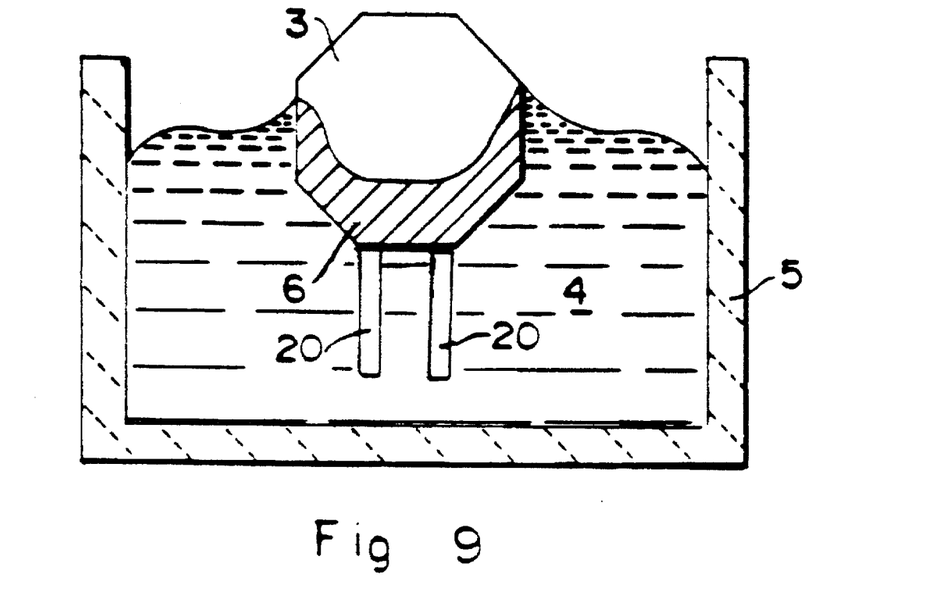
FIG. 9 shows a preform afloat in a pool of molten matrix metal, the preform having attached thereto sacrificial support means.

Still further, as shown in FIG. 9, a support means comprising a plurality of sacrificial protrusions 20 extends from a bottom surface of the preform 3. As the preform 3 sinks into the matrix metal 4, the protrusions 20 of any desired length or configuration will contact the refractory container 5 so as to limit the amount that the preform 3 sinks into the matrix metal 4. Once a desired amount of infiltration has been achieved, the preform is removed from the matrix metal and the protrusions 20 are removed by any suitable means such as cutting, sawing, grinding, etc.

Figure 10:
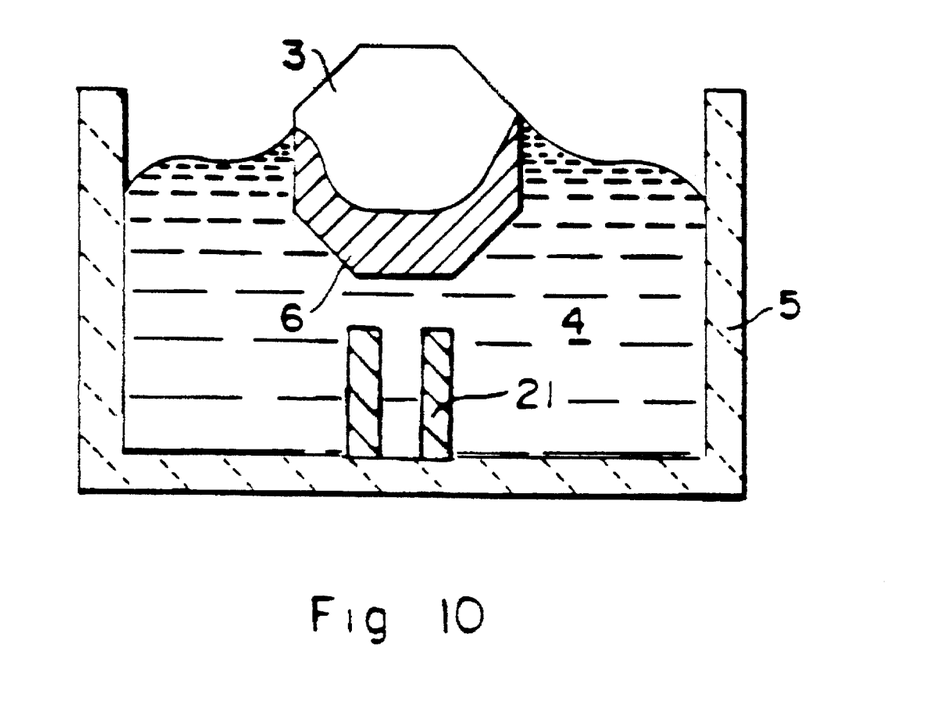
FIG. 10 shows a preform afloat in a pool of molten matrix metal, the preform floating above a support means which extends upwardly from the refractory container.

FIG. 10 shows an alternate embodiment wherein a support means 21 extends from a bottom surface of a refractory vessel 5. The support means 21 functions in a substantially similar manner to the sacrificial protrusion discussed above and shown in FIG. 9, however, the support means 21, typically, do not need to be removed from the formed metal matrix composite body because they are not integral therewith.

The composition of the support means 20 and 21 is not critical to the present invention. However, the material which is selected for use as the support means should not affect adversely the spontaneous infiltration process. For example, the support means may comprise a disposable material (e.g., cement, glass, etc.) which is discarded subsequent to spontaneous infiltration of the preform. Alternatively, the support means may comprise a more durable material, for example, graphite, which can be recycled through a plurality of spontaneous infiltration procedures.

Figure 11:
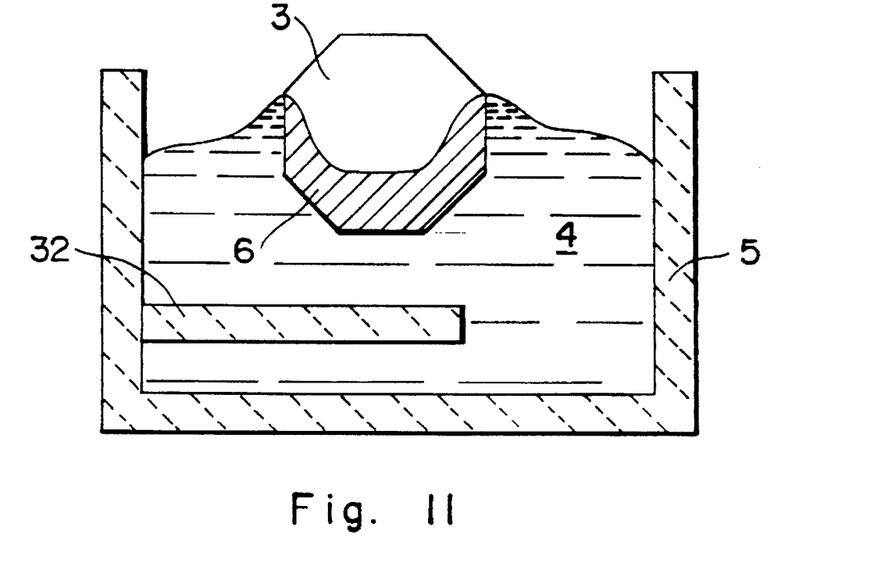
FIG. 11 shows a means for supporting a preform in a pool of molten matrix metal, the support means comprising a shelf which extends across at least a portion of the nonreactive vessel.

Moreover, the support means for use with the present invention should not be construed as being limited to those embodiments (e.g., pins or legs) discussed above herein. For example, an acceptable support means may comprise a perforated container (e.g., formed from a refractory screen). Specifically, a plurality of similar or distinct preforms may be enclosed within the perforated container and placed upon a pool of molten matrix metal for spontaneous infiltration. Further, the support means may comprise a protuberance which may be unitary with the nonreactive vessel which houses the matrix metal (e.g., a portion of the nonreactive vessel which extends into the molten pool of matrix metal). Still further, as FIG. 11 illustrates the support means may comprise a screen or shelf 32 which extends across (e.g., horizontally, angled, etc.) at least a portion of the nonreactive vessel at a predetermined depth. Thus, any means which controls the amount that a preform is permitted to sink into a pool of matrix metal may function as a desirable support means for use with the present invention.

The flotation process of the present invention may be utilized to produce continually a plurality of metal matrix composite bodies. Specifically, any desired quantity of preforms may be continually supplied to a surface of a pool of molten matrix metal. The preforms could be removed from the matrix metal by any suitable means once infiltration has been completed.

Figures 12A, 12B, 12C, 12D, 12E:
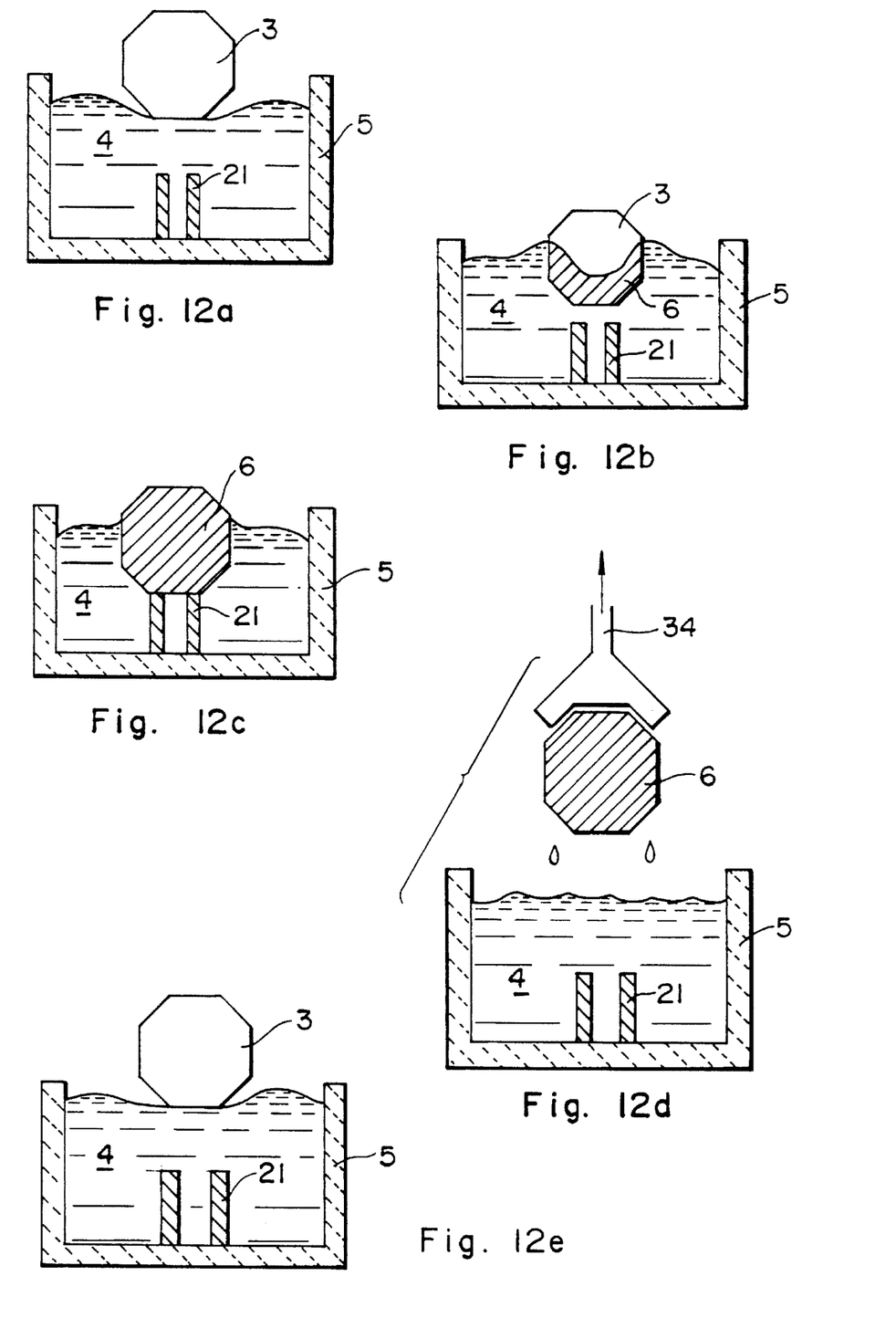
FIG. 12a shows a preform afloat in a pool of molten matrix metal.
FIG. 12b shows the preform partially infiltrated with matrix metal.
FIG. 12c shows a fully infiltrated preform, i.e., a formed metal matrix composite body, supported in the pool of molten matrix metal.
FIG. 12d shows the formed metal matrix composite body being withdrawn from the pool of molten matrix metal. Finally.
FIG. 12e shows another preform placed on the surface of the pool of matrix metal.

One embodiment of this "continual production" process is highlighted by the sequence of illustrations in FIG. 12. In this embodiment, a preform 3 is placed upon a pool of molten matrix metal 4 contained within a refractory container 5 (see FIG. 12a). Spontaneous infiltration of the preform by the matrix metal into at least a portion of the preform 3 produces a metal matrix composite body 6 in that portion of the preform 3 which has been infiltrated (see FIG. 12b). As infiltration proceeds, the preform sinks into the pool of matrix metal until contacted by support means 21 (see FIG. 12c). Once a desired amount of infiltration has been achieved, the at least partially infiltrated preform is removed from the pool of molten matrix metal by any suitable means 34 (see FIG. 12d). Another preform 3 may then be contacted with the pool of matrix metal to repeat the production sequence (see FIG. 12e).

It will be understood that for a preform initially comprising a ceramic material and infiltration enhancer precursor, at least some of the infiltration enhancer precursor should be converted to infiltration enhancer. This conversion can be performed as the preform and matrix metal ingots are heated by, for example, exposing the preform to an infiltrating atmosphere during heating.

In a preferred embodiment it is possible that the infiltration enhancer precursor can be at least partially reacted with the infiltrating atmosphere such that infiltration enhancer can be formed in at least a portion of the preform prior to or substantially simultaneous with contacting the preform with the molten matrix metal (e.g., if magnesium was the infiltration enhancer precursor and nitrogen was the infiltrating atmosphere, the infiltration enhancer could be magnesium nitride which would be located in at least a portion of the preform). Alternatively, an infiltrating atmosphere (e.g., nitrogen gas in the aluminum/magnesium/nitrogen system) can be bubbled into the molten matrix metal to contact the preform and react with the infiltration enhancer precursor to form the infiltration enhancer after immersion in the matrix metal bath. Moreover, the preform can be exposed to the infiltrating atmosphere as it floats upon the surface of the molten matrix metal, thereby converting infiltration enhancer precursor to infiltration enhancer.

Figure 13:
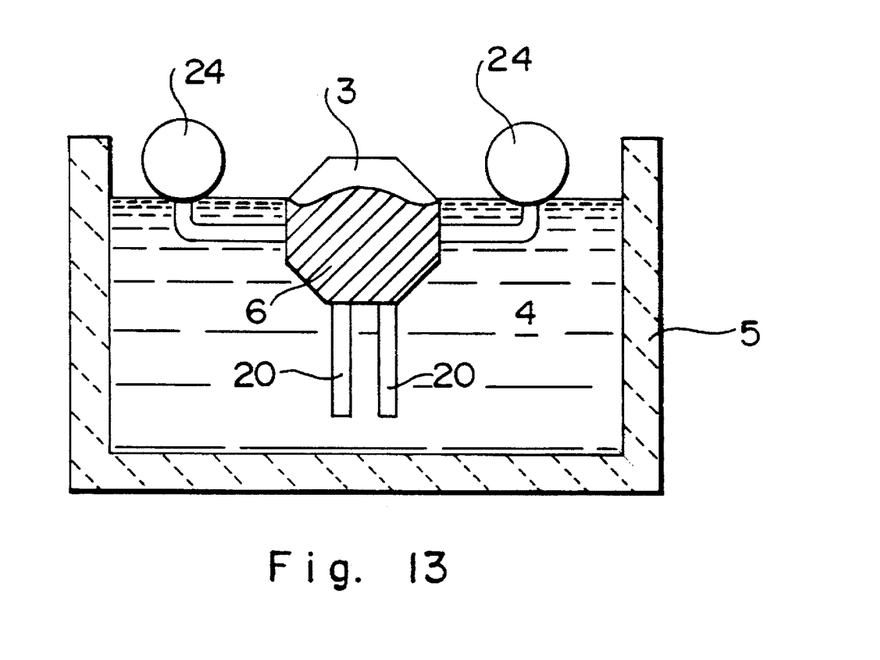
FIG. 13 shows a flotation means for assisting a preform to float in a pool of molten matrix metal.

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not react with the aluminum matrix metal when the aluminum is made molten. A preform can then be contacted with the molten aluminum matrix metal. The preform may float adjacent to or on a surface of the molten matrix metal, or somewhere within the molten matrix metal, or even sink to the bottom of the molten matrix metal, due to its natural buoyancy relative to the molten matrix metal. Moreover as illustrated in FIG. 13, the preform may be removably attached to a support means (e.g., floating means 24) which assists or causes the preform to float. The floating means would comprise any suitable material which is nonreactive with the spontaneous system and is sufficiently positively or negatively buoyant in molten matrix metal to counteract to a desired extent any negative or positive buoyancy of a preform or metal matrix composite body. Still further, the preform may be contacted with matrix metal prior to the matrix metal becoming molten, or the preform may be embedded with particles or chunks of solid matrix metal. Thereafter, the matrix metal would be heated to render it molten.

Figure 4:
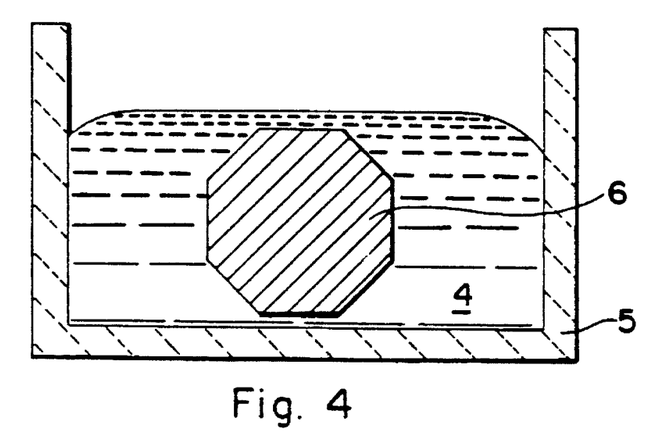
FIG. 4 shows a metal matrix composite body afloat in the molten matrix metal pool.

During infiltration of the preform, the preform, whether attached to a floating means or not, may begin to sink at least partially into the pool of molten matrix metal, thus indicating that infiltration has occurred, as shown in FIG. 4. It will be understood that such sinking would occur according to the change in buoyancy of the preform as the extent of matrix metal infiltration into the preform progresses. Thus, according to the relative buoyancy of the body before and after infiltration, the body may rise, sink, or change its position within the molten matrix metal bath after infiltration is complete.

Under the conditions employed in the method of the present invention, in the case of an aluminum/magnesium/nitrogen spontaneous infiltration system, the preform may be sufficiently permeable to permit the nitrogen-containing gas to penetrate or permeate the preform and contact the molten matrix metal. Moreover, the permeable preform can accommodate infiltration of the molten matrix metal, thereby causing the nitrogen-permeated preform to be infiltrated spontaneously with molten matrix metal to form a metal matrix composite body. The extent of spontaneous infiltration and formation of the metal matrix composite will vary with a given set of process conditions, including the magnesium content of the aluminum matrix metal alloy and/or the preform, the amount of magnesium nitride in the preform and/or the aluminum matrix metal, the presence of additional alloying elements (e.g., silicon, iron, copper, manganese, chromium, zinc, and the like), the average size (e.g., particle diameter) of the filler material comprising the preform, the surface condition and type of filler material, the nitrogen concentration of the infiltrating atmosphere, the time permitted for infiltration and the temperature at which infiltration occurs.

For example, for infiltration of the molten aluminum matrix metal to occur spontaneously, the aluminum matrix metal can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the aluminum matrix metal to result in spontaneous infiltration of the filler material or preform. Inclusion of sufficient magnesium and/or magnesium nitride in the aluminum matrix metal obviates any need for a separate provision of magnesium or magnesium nitride in the preform or in the infiltrating atmosphere.

Loss of magnesium from the spontaneous system due to, for example, volatilization should be avoided to the extent that some magnesium remains to form infiltration enhancer. Thus, it is desirable to utilize a sufficient amount of initial alloying elements in the matrix metal to assure that spontaneous infiltration will not be adversely affected by volatilization. Further, the presence of magnesium in both the preform and matrix metal or the preform alone may result in a reduction in the required amount of magnesium needed to achieve spontaneous infiltration (discussed in greater detail later herein). The volume percent of nitrogen in the nitrogen infiltrating atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the molten matrix metal to infiltrate a preform or filler material depends on one or more variables such as the processing temperature, time, the presence of auxiliary alloying elements such as silicon or zinc, the nature of the filler material or preform, the location of the magnesium in one or more components of the spontaneous system, and the nitrogen content of the atmosphere. Lower temperatures or shorter heating times can be used to obtain complete infiltration as the magnesium content of the matrix metal and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, matrix metal alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration.

The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 CRYSTOLON® (99 percent pure silicon carbide from Norton Co.). However, in the presence of magnesium, silicon has been found to promote the infiltration process. In addition, the amount of magnesium varies if it is supplied exclusively to the preform or filler material.

It has been discovered that spontaneous infiltration will occur with a lesser weight percent of magnesium supplied to the system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform contacted with an aluminum matrix metal, it has been discovered that the preform containing at least about 1 percent by weight magnesium and being in the presence of a substantially pure nitrogen atmosphere is spontaneously infiltrated by the matrix metal. In the case of an alumina preform, the amount of magnesium required to achieve acceptable spontaneous infiltration is slightly higher. Specifically, it has been found that an alumina preform, when contacted with a similar aluminum matrix metal at about the same temperature as the aluminum that infiltrated into the silicon carbide preform and in the presence of the same nitrogen atmosphere, may require at least about 3 percent by weight magnesium to achieve similar spontaneous infiltration.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the infiltration enhancer or infiltration enhancer precursor to be alloyed with the matrix metal, but rather, simply for one or the other or both of them to be supplied to the spontaneous system). If the magnesium was applied to a surface of the matrix metal it may be preferred that said surface should be the surface which is closest to, or preferably in contact with, the permeable mass of filler material or vice versa, or that such magnesium should be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the matrix metal alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable preform including an infiltration enhancer precursor and/or an infiltration enhancer may be placed into contact with molten matrix metal (e.g., aluminum) in the presence of an infiltrating atmosphere (e.g., a nitrogen-containing gas) maintained for the entire time required to achieve infiltration. This is accomplished by maintaining a continuous flow of gas into contact with the preform and molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effect on the molten metal and/or the infiltration enhancer and/or the infiltration enhancer precursor.

The present method of forming a metal matrix composite is applicable to a wide variety of filler materials, and the choice of filler materials will depend on such factors as the matrix metal alloy, the process conditions, the reactivity of the molten matrix metal alloy with the filler material, and the properties sought for the final metal matrix composite product. For example, when aluminum is the matrix metal, suitable filler materials include (a) oxides, e.g., alumina; (b) carbides, e.g., silicon carbide; (c) borides, e.g., aluminum dodecaboride, and (d) nitrides, e.g., aluminum nitride. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the from of continuous filaments, such as multifilament tows. Further, the ceramic mass or preform may be homogeneous or heterogeneous.

It also has been discovered that certain filler materials exhibit enhanced infiltration relative to filler materials by having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Copending and Commonly Owned application Ser. No. 819,397, which issued on Jul. 25, 1989, as U.S. Pat. No. 4,851,375 that is entitled "Composite Ceramic Articles and Methods of Making Same", in the names of Marc S. Newkirk et al., also exhibit desirable infiltration properties relative to commercially available alumina products. The subject matter of each of the issued Patent and Copending Patent Application is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patent and Patents Application.

The size and shape of the filler material can be any that may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, it is sufficient that the mass of filler material, when shaped into a preform, be permeable, i.e., permeable at least to the molten matrix metal, and possibly to the infiltrating atmosphere).

The method of forming metal matrix composites according to the present invention, not being dependent on the use of pressure to force or squeeze molten metal matrix into a preform or a mass of filler material, permits the production of substantially uniform matrix metal composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with close cell porosity or into a fully dense structure that would prevent infiltration by the molten alloy.

It has been observed that for aluminum infiltration and matrix formation around a ceramic filler, wetting of the ceramic filler by the aluminum matrix metal may be an important part of the infiltration mechanism. At low processing temperatures, a negligible or minimal amount of metal nitriding occurs resulting in a minimal discontinuous phase of aluminum nitride dispersed in the metal matrix. However, as the upper end of the temperature range is approached, nitration of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the ceramic filler decreases and as the nitrogen concentration of the atmosphere increases.

It is therefore possible to tailor the constituency of the metal matrix during formation of the matrix metal composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. In accordance with the present invention, a preform undergoing spontaneous infiltration, i.e., a preform that is partially infiltrated by a first matrix metal, could be induced by a gas stream or other mechanism to float into a reservoir area comprising a second matrix metal. In addition, molten metals frequently are very miscible with each other which would result in the reservoir metal mixing with the first source of matrix metal so long as an adequate amount of time is given for the mixing to occur. Thus, by using a reservoir metal which is different in composition than the first source of matrix metal, it is possible to tailor the properties of the metal matrix to meet various operating requirements and thus tailor the properties of the metal matrix composite.

It will be understood that a barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material or preform. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the ceramic filler.

Suitable barrier means includes materials such as graphite and alumina which are substantially non-wettable by the infiltrating molten matrix metal alloy under the process conditions employed. A barrier of this type exhibits little or no affinity for the molten matrix metal alloy, and movement beyond the defined surface boundary of the filler material or preform is prevented or inhibited by the barrier means. The barrier reduces any final machining or grinding that may be required of the metal matrix composite product, and can provide additional structural integrity to the preform and the metal matrix composite. In addition, the barrier means may be suitably shaped to permit grasping of the composite and its removal from the pool of matrix metal. As stated above, the barrier may be permeable or porous, or rendered permeable by puncturing, to permit the infiltrating atmosphere to contact the molten matrix metal alloy and the preform containing an infiltration enhancer precursor.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite tape product that is sold under the trademark GRAFOIL®, registered to Union Carbide. This graphite tape exhibits sealing characteristics that prevent the migration of molten aluminum alloy beyond the defined surface boundary of the filler material. This graphite tape is also resistant to heat and is chemically inert. GRAFOIL® graphite material is flexible, compatible, conformable and resilient. It can be made into a variety of shapes to fit any barrier application. However, graphite barrier means may be employed as a slurry or paste or even as a paint film around and on the boundary of the filler material or preform. For example, a barrier means may be provided by spraying graphite (e.g., DAG-graphite) onto a majority of the surfaces of a perform. At least a portion of one surface of the preform is not sprayed with graphite. The surface of the preform without graphite communicates with the molten matrix metal to permit spontaneous infiltration of the matrix metal into the preform. GRAFOIL® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. The transition metal borides are typically available in a particulate form (1–30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatility organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, other finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means. Barriers may thus be used in connection with the preforms of the present invention to control infiltration such that net or near net shapes are achieved upon infiltration of the floated preform.

Various demonstrations of the present invention are included in the Examples immediately following. However, these Examples should be considered as being illustrative and should not be construed as limiting the scope of the invention as defined in the appended claims.

EXAMPLE 1

A filler material was prepared by mixing 1000 grit silicon carbide powder (39 CRYSTOLON® from Norton Co.) with about 2.5 weight percent of 325 mesh magnesium powder (available from Johnson Matthey Co.). To obtain uniform mixing, these powders were placed in a sealed container and tumbled in a ball mill for approximately 12 hours. The ball mill provided only uniform mixing; no grinding or deformation of the powders was attempted or achieved.

Figure 5:
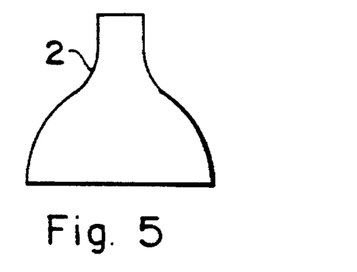
FIG. 5 shows a consumable mold and a preform in accordance with a further embodiment of the present invention.

Referring to FIG. 5, the filler was hand-packed as much as possible into a mold (2) consisting of a copper tube which served to shape the filler. The walls of the copper tube (2) (available from General Copper Co) were approximately 0.8 millimeters thick, and the tube was a bell-shaped form 3.8 centimeters long and 2.5 centimeters wide at its wider end. The wider end of the tube (2) was left uncovered while the narrower ends were closed with aluminum foil to prevent escape of the filler during packing.

Figure 6:
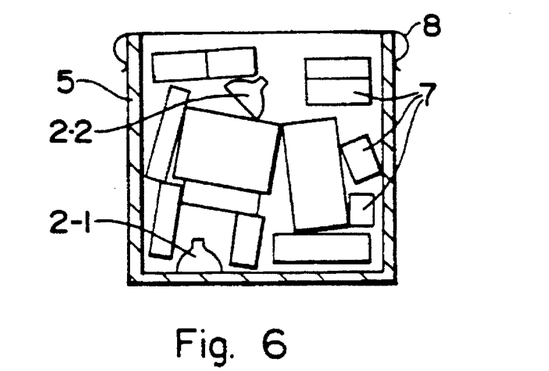
FIG. 6 shows consumable molds surrounded by matrix metal ingots in a nonreactive vessel for housing matrix metal in accordance with Example 1.

Two such filled molds (2-1), (2-2) were then placed in a nonreactive vessel (5) containing a number of ingots (7) of an aluminum alloy as illustrated in FIG. 6. The vessel (5) consisted of a welded 300-series stainless steel box lined with two layers of a graphite foil (e.g., PERMA FOIL®, available from T.T. America Co.) of about 0.25 millimeter thickness to make the vessel reusable. The composition of the alloy was about 85 weight percent aluminum, 12 weight percent silicon and 3 weight percent magnesium, (Al-12Si-3Mg), and the ingots (7) were arranged so that they surrounded the tubes (2-1) and (2-2) in the vessel (5). One of the molds (2-1) was disposed near the bottom of the vessel, while the other mold (2-2) was disposed near the top. The vessel (5) was then covered with 0.7 millimeter-thick copper foil (8) (available from Atlantic Equipment Engineering Co.) and placed in an electric resistance-heated furnace. The interior of the vessel was then subjected to a purge of nitrogen gas at a flow rate of about 1.5 liters per minute introduced through a hole in the copper foil (8).

The furnace temperature was increased from room temperature to about 750° C. over a period of 2 to 2.5 hours, thereby rigidizing the filler material into preforms that would have retained their shapes even without the molds.

The vessel and its contents were held at about 750° C. for approximately 2.5 hours, by the end of which time a pool of aluminum alloy had formed in the vessel, the copper molds surrounding the rigidized filler had melted and dispersed into the melted aluminum alloy, and the alloy had spontaneously infiltrated the filler to form metal matrix composite bodies. It will be noted that the filler maintained its shape even after consumption of the copper molds, probably as a result of magnesium nitride formation in the filler as the temperature increased (or possibly the result of a sintering effect), and then as a result of the high proportion of filler in the metal matrix composite body.

At the end of the 2.5 hour period, the metal matrix composite bodies were naturally buoyant in the pool at 3 to 5 centimeters below the surface of the pool. The mold (2-2) that was located near the top of the vessel had floated for a time on the surface of the pool, and then gradually sank into the pool after the mold dissolved in the pool and as spontaneous infiltration progressed. The mold (2-1) that was located at the bottom of the vessel eventually dissolved and the infiltrated, rigidized preform rose to about the same depth within the pool as the preform (2-2) that had been located near the top. The metal matrix composites were gently scooped out of the alloy pool with a stainless steel spatula and allowed to cool in the ambient air of the laboratory. The resultant bodies were fully spontaneously infiltrated and demonstrated good net shape characteristics.

EXAMPLE 2

Figures 7, 8:
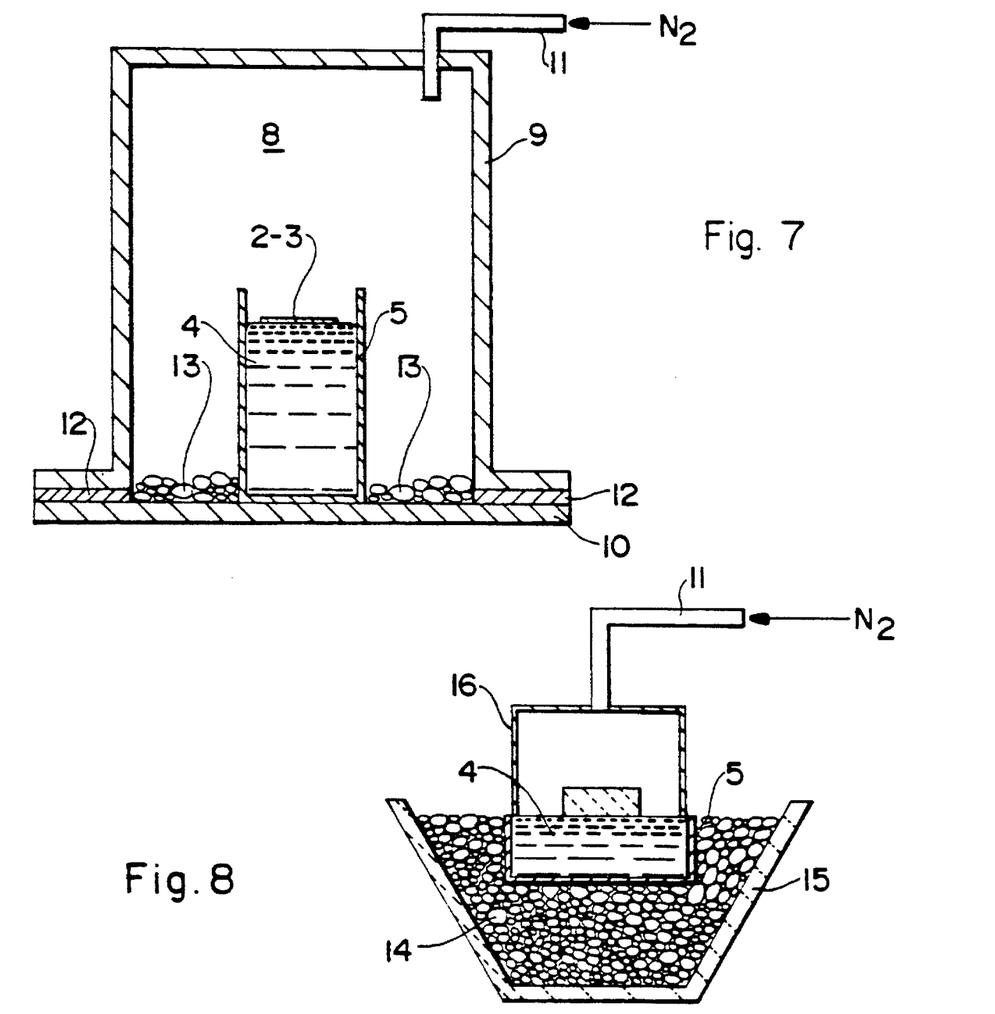
FIG. 7 illustrates a schematic cross-sectional view of the lay-up and apparatus for spontaneously infiltrating a body by flotation in molten matrix metal in accordance with Example 2.
FIG. 8 illustrates a schematic cross-sectional view of the lay-up apparatus for spontaneously infiltrating a body by flotation in molten matrix metal in accordance with Example 3.

A preform comprising 500 grit silicon carbide powder (39 CRYSTOLON® from Norton Co.) was sediment cast by standard techniques and prefired in the shape of a half piston pin. The preform of the half piston pin, several of which are used in internal combustion engines, was substantially tubular, having an outer diameter of about 4 millimeters, an inner diameter of about 3 millimeters and a length of approximately 5 centimeters. Referring to FIG. 7, the preform (2-3) was introduced to the surface of a pool (4) which was at a temperature of about 700° C., and was comprised of a mixture of a slightly modified 380.1 molten aluminum alloy, (from Belmont Metals) having a composition of about 7.5–9.5% Si, 3.0–4.0% Cu, ≦2.9% Zn, ≦6.0% Fe, ≦0.5% Ni, ≦0.35% Sn, ≦0.5% Mn and about 0.17–0.18% Mg to which an additional 5 weight percent Mg was added.

The pool (4) was contained in a nonreactive container (5) which comprised a 300 series stainless steel can lined with a $^{15}/_{1000}$ inch thick grade GTB graphite tape product, produced by Union Carbide and sold under the trademark GRAFOIL® (from Union Carbide). The container (5) and, thus, the preform (2-3) and pool (4), were maintained in a pure nitrogen atmosphere by purging a cavity (8) formed between a 300 series stainless steel box (9) and plate (10). The nitrogen infiltrating atmosphere was introduced to the cavity (8) through a stainless steel tube (11) inserted and affixed through a matching hole in the box (9). A copper gasket (12) was inserted between the box (9) and plate (10) to maintain the nitrogen atmosphere within the cavity (8). In addition, a quantity of titanium chips (13) were distributed in the cavity (8) to react with any oxygen or other foreign material which may contaminate the infiltration enhancer and/or the matrix metal precursor and/or the infiltration enhancer in the aluminum/magnesium/nitrogen spontaneous infiltration system.

The reaction vessel comprising the container (5), box (9), and plate (10) were heated in an electric resistance-heated furnace from room temperature to about 700° C. over a period of about 5 hours to melt the matrix metal alloy. The preform (2-3), was placed thereafter on the surface of the pool (4) of molten aluminum alloy while briefly lifting the box (9). The temperature was then maintained at about 800° C. for a period of about 25 hours, at the end of which time the box (9) was again lifted and the half piston pin, which had sunk into the pool, was retrieved by use of a stainless steel spatula. The half piston pin was then allowed to cool in the ambient air of the laboratory. The aluminum alloy had fully spontaneously infiltrated the preform to form a metal matrix composite body which showed good net shape fidelity.

EXAMPLE 3

Referring to FIG. 8, a reaction vessel was prepared by placing a graphite-lined stainless steel can (5) embedded in a quantity of coarse-grained Wollastonite (14) (Nyad SP, available from NYCO, Inc.) in an alumina crucible (15) having 99.7% purity. A 300 series stainless steel can (16) including stainless steel purge tube (11) was placed over the can (5). A pool (4) comprising a mixture of a molten aluminum alloy, having the same composition as the aluminum alloy in Example 2, was formed in the can (5).

The pool (4) was formed by heating the reaction vessel and crucible in an electric resistance-heated furnace while maintaining a continuous purge of substantially pure nitrogen gas into the stainless steel can (16). The vessel was heated from room temperature to about 800° C. over a period of about 5 hours. When the pool (4) of alloy reached a temperature of about 700° C., the stainless steel can (16) was lifted, and a preform was quickly placed on the surface of the pool, and the stainless steel can (16) was replaced. The vessel was then maintained at about 800° C. for a period of about 30 hours, after which time the preform was removed from the pool and allowed to air cool.

The preform comprised a simple cylindrical form approximately 1.3 centimeters in diameter by 1.3 centimeters long of 220 grit silicon carbide (39 CRYSTOLON® from Norton Company). The preform was removed at about 700° C. and cooled to room temperature. Complete spontaneous infiltration was achieved and good net shape characteristics were exhibited.

What is claimed is:

1. A method for forming a metal matrix composite body comprising:

forming a pool of molten matrix metal;

housing said pool of molten matrix metal in a substantially non-reactive vessel;

contacting a permeable preform with said pool of molten matrix metal;

providing a support means for controlling the amount of sinking of said preform while in contact with said pool of molten matrix metal, said support means comprising at least one member extending from at least a portion of said substantially non-reactive vessel such that said controlling of the amount of sinking of said preform is effected by contact of said support means with said preform;

spontaneously infiltrating at least a portion of the preform with the molten matrix metal, thereby causing said preform to sink; and continuing said infiltrating spontaneously at least until said preform contacts said support means.

2. The method according to claim 1, wherein at least a portion of said preform is coated with a barrier means.

3. The method according to claim 2, wherein said barrier means comprises graphite.

4. The method according to claim 1, wherein said at least one member extending from at least a portion of said substantially non-reactive vessel comprises at least one pin extending upwardly toward said preform within said source of molten matrix metal alloy.

5. The method according to claim 1, wherein said support means comprises a protuberance which is unitary with and extends from at least a portion of the substantially non-reactive vessel which houses the matrix metal.

6. The method of claim 1, wherein the support means comprises a screen or shelf which extends across at least a portion of the substantially non-reactive vessel which houses the matrix metal.

7. The method of claim 1, further comprising the step of providing an infiltrating atmosphere, wherein the infiltrating atmosphere communicates with at least one of the preform and matrix metal for at least a portion of the period of infiltration.

8. The method of claim 7, wherein the infiltrating atmosphere comprises an atmosphere selected from the group consisting of oxygen and nitrogen.

9. The method of claim 1, wherein a plurality of metal matrix composite bodies are formed in a substantially continual process.

10. The method of claim 1, wherein said contacting comprises floating said permeable preform at a location with respect to said pool of molten matrix metal selected from the group consisting of (1) on a top surface of said pool, and (2) adjacent to a top surface of said pool.

11. A method of forming a metal matrix composite body comprising the steps of:

forming a pool of molten matrix metal;

housing said pool of molten matrix metal in a substantially non-reactive vessel;

contacting a permeable preform with said pool of molten matrix metal;

providing a support means for controlling the amount of sinking of said preform while in contact with said pool of molten matrix metal, said support means comprising at least one member extending from at least a portion of said permeable preform such that said controlling of the amount of sinking of said preform is effected by contact of said support means with said substantially non-reactive vessel;

spontaneously infiltrating at least a portion of the preform with the molten matrix metal, thereby permitting said preform to at least begin to sink; and continuing said spontaneously infiltrating at least until said support means contacts said substantially non-reactive vessel.

12. The method according to claim 11, wherein said at least one member extending from at least a portion of said preform comprises at least one pin removably affixed to said preform.

13. The method of claim 11, further comprising a means for causing said preform to float, said floating means being removably attached to said preform.

14. A method for forming a metal matrix composite body, comprising:

providing a source of matrix metal;

housing said matrix metal in a substantially non-reactive vessel;

contacting a permeable preform with said matrix metal;

heating said matrix metal to a temperature above its melting point to form a body of molten matrix metal, whereby said preform displays with respect to said molten matrix metal a buoyancy selected from the group consisting of positive buoyancy and neutral buoyancy; and providing a support means for controlling the amount of sinking of said preform while in contact with said molten matrix metal, said support means comprising at least one member selected from the group consisting of (1) at least one member extending from at least a portion of said substantially non-reactive vessel such that said controlling of the amount of sinking of said preform is effected by contact of said support means with said preform and (2) at least one member extending from at least a portion of said permeable preform such that said controlling is effected by contact of said support means with said substantially non-reactive vessel, and whereby said support means does not substantially assist in providing positive buoyancy to said preform during infiltration;

spontaneously infiltrating at least a portion of the preform with the molten matrix metal, whereby said preform at least begins to sink within said source of molten matrix metal; and continuing said spontaneously infiltrating at least until said support means contacts both said preform and said substantially non-reactive vessel.

15. The method of claim 14, wherein said matrix metal comprises aluminum.

16. The method according to claim 14, further comprising providing an infiltrating atmosphere which contacts said permeable preform; and providing at least one of an infiltration enhancer and an infiltration enhancer precursor to at least one of said matrix metal alloy, said permeable preform and said infiltrating atmosphere to cause spontaneous infiltration of said matrix metal alloy and said preform to occur.

17. The method of claim 14, wherein said contacting comprises floating said preform at a location selected from the group consisting of (1) on a top surface of said source of molten matrix metal alloy, (2) adjacent to a top surface of said source of molten matrix alloy and (3) within said source of molten matrix metal alloy.

18. The method of claim 14, further comprising withdrawing said preform from said source of molten matrix metal after a desired amount of spontaneous infiltration has occurred.

19. The method of claim 14, wherein said permeable preform comprises at least one filler material selected from the group consisting of aluminum oxide, silicon carbide and aluminum nitride.

20. The method of claim 15, wherein said matrix metal further comprises at least one alloying element selected from the group consisting of silicon, iron, copper, manganese, chromium, zinc, magnesium, strontium and calcium.

\* \* \* \* \*